(12) United States Patent
Liu et al.

(10) Patent No.: US 11,796,159 B2
(45) Date of Patent: Oct. 24, 2023

(54) BACKLIGHT MODULE AND DISPLAY DEVICE

(71) Applicants: Changsha HKC Optoelectronics Co., Ltd., Changsha (CN); HKC CORPORATION LIMITED, Shenzhen (CN)

(72) Inventors: Hu Liu, Changsha (CN); Haoxuan Zheng, Changsha (CN)

(73) Assignees: Changsha HKC Optoelectronics Co., Ltd., Changsha (CN); HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/114,793

(22) Filed: Feb. 27, 2023

(65) Prior Publication Data

US 2023/0265992 A1     Aug. 24, 2023

(30) Foreign Application Priority Data

Feb. 24, 2022    (CN) .................. 202210172627.X

(51) Int. Cl.
| | |
|---|---|
| *F21V 19/00* | (2006.01) |
| *F21V 7/28* | (2018.01) |
| *F21Y 115/10* | (2016.01) |
| *F21Y 105/10* | (2016.01) |

(52) U.S. Cl.
CPC .............. *F21V 19/003* (2013.01); *F21V 7/28* (2018.02); *F21Y 2105/10* (2016.08); *F21Y 2115/10* (2016.08)

(58) Field of Classification Search
CPC ...... F21V 19/003; F21V 7/28; F21Y 2105/10; F21Y 2115/10
See application file for complete search history.

(56) References Cited

U.S. PATENT DOCUMENTS

2007/0035969 A1*   2/2007   Kaneko ............ G02F 1/133603
                                                   257/E33.072

FOREIGN PATENT DOCUMENTS

CN           111981359 A   *   11/2020

* cited by examiner

*Primary Examiner* — Mary Ellen Bowman
(74) *Attorney, Agent, or Firm* — Franklin & Associates International Inc; Matthew Lambrinos

(57) ABSTRACT

Disclosed are a display device and a backlight module comprising a backplane and a backlight part provided on the backplane, in which a seam is provided between the two adjacent backlight parts; an adjustment part is installed at the seam; the adjustment part comprises: a connecting portion, an end of which is installed on the backplane through the seam, in which a depth at which the connecting portion is installed in the backplane is adjustable; and an adjustment portion provided at an end of the connecting portion away from the backplane, in which an outer diameter of the adjustment portion tapers along a direction toward the backplane, and an end of the adjustment portion enters the seam.

20 Claims, 3 Drawing Sheets

BACKLIGHT MODULE AND DISPLAY DEVICE

CROSS REFERENCE TO RELATED APPLICATIONS

The present disclosure claims all the benefits of Chinese Patent Application No. 202210172627.X, filed on Feb. 24, 2022 before the China National Intellectual Property Administration of the People's Republic of China, entitled "Backlight Module and Display Device", the contents of which are explicitly incorporated herein by reference in their entirety.

FIELD

The present disclosure relates to the field of display technology, in particular to a backlight module and a display device.

BACKGROUND

For medium and large size Mini LED display modules, thousands of Mini LEDs are generally welded and evenly distributed on the glass base plate or PCB base plate; if the backlight assembly is welded with Mini LEDs on a whole base plate, it will cause high cost problems. Therefore, in the related art, a large-sized backlight assembly is generally formed by splicing a plurality of the glass base plates or PCB base plates. In the actual production process, in order to reserve space for the thermal expansion and contraction of the base plate, a seam is generally reserved between two adjacent base plates.

In the actual production process, due to the size tolerance of the backplane and the base plate of the backlight unit, after the backlight module is assembled, the size of the seam of the Mini LED backlight unit will be uneven, the seam being too large, too small or the uneven sizes will affect the quality of the backlight module; the above problems will also affect the reliability test of the Mini LED module, thereby affecting the qualified product rate of the product.

SUMMARY

An object of the present disclosure is to provide a backlight module and a display device to solve the problem in the related art that the seam of the backlight module is too large or too small or uneven in size due to a dimensional tolerance. By providing an adjustment part for adjusting spacing between backlight parts; when assembling the backlight module, an operator can finely adjust a width of the seam between the backlight parts by means of the adjustment part, so that the seam of the product meets standard requirements.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

In order to more clearly illustrate the embodiments of the present disclosure or the technical solutions in the related art, the following briefly introduces the accompanying drawings that need to be used in the description of the embodiments or the related art. In other words, on the premise of no creative labor, other drawings can also be obtained from these drawings.

DESCRIPTION OF REFERENCE NUMERALS

1. Backplane;
11. Assembly hole;
2. Backlight part;
21. Seam;
22. Light-emitting unit;
23. Base plate;
231. Avoidance groove;
3. Adjustment part;
31. Connecting portion;
32. Adjustment portion;
321. Upper end face;
33. Kit;
331. First portion;
3311, Through hole;
332, Second portion;
3321. Accommodating groove;
4. Insulating buffer layer;
100. Backlight module;
200. Display panel;
300. Housing.

DETAILED DESCRIPTION

In order to make the purposes, technical solutions and advantages of the embodiments of the present disclosure clearer, the technical solutions in the embodiments of the present disclosure will be described clearly and completely below with reference to the drawings in the embodiments of the present disclosure. Obviously, the described embodiments are parts of the embodiments of this disclosure, but not all of the embodiments. Based on the embodiments in the present disclosure, all other embodiments obtained by those of ordinary skilled in the art without creative work shall fall within the protection scope of the present disclosure.

Embodiment 1

Figure 1:
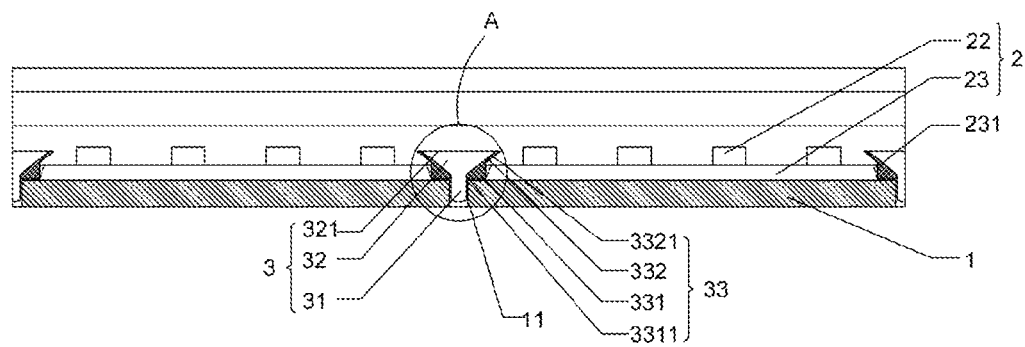
FIG. 1 is a schematic structural side view of the backlight module in Embodiment 1 of the present disclosure.
Figure 2:
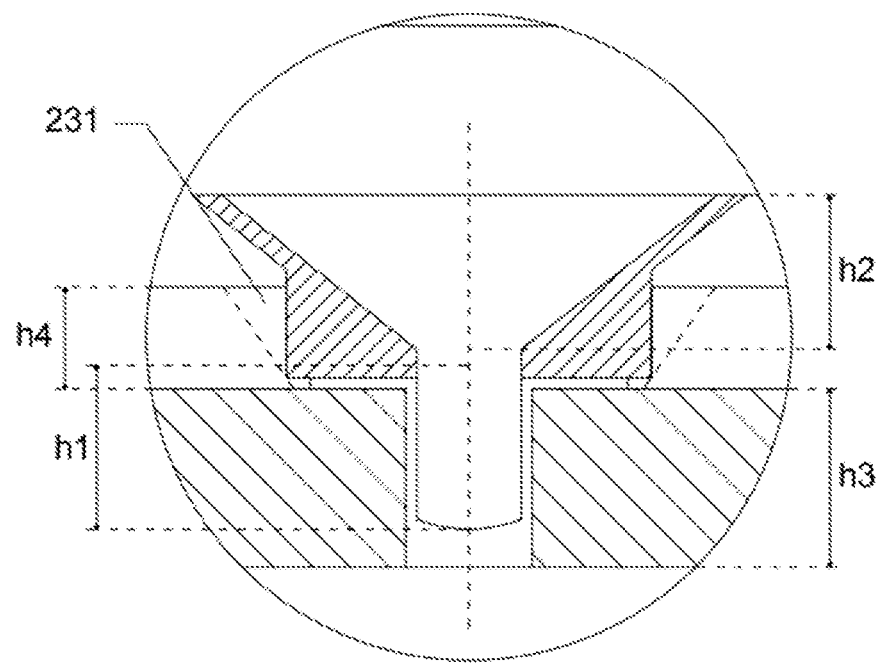
FIG. 2 is a partial enlarged view of A in FIG. 1.
Figure 3:
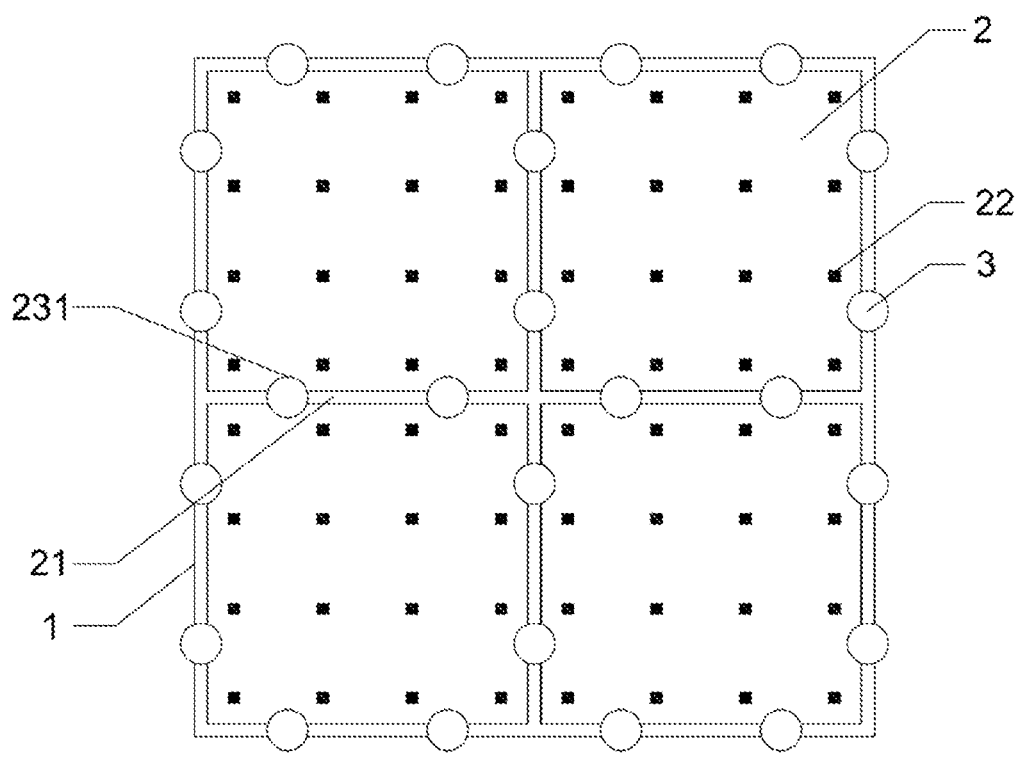
FIG. 3 is a schematic structural top view of the backlight module in Embodiment 1 of the present disclosure.

Referring to FIGS. 1 to 3, the present disclosure provides a backlight module, comprising a backplane 1 and a plurality of backlight parts 2 installed on the backplane 1, wherein a seam 21 is spaced between two adjacent backlight parts 2, an adjustment part 3 is installed at the seam 21, and the adjustment part 3 comprises a connecting portion 31 and an adjustment portion 32.

An end of the connecting portion 31 is installed on the backplane 1 through the seam 21; the depth at which the connecting portion 31 is installed in the backplane 1 is adjustable.

The adjustment portion 32 is disposed on an end of the connecting portion 31 away from the backplane 1, the outer diameter of the adjustment portion 32 tapers in the direction toward the backplane 1. An end of the adjustment portion 32 enters the seam 21, by adjusting the depth at which the connecting portion 31 is installed in the backplane 1, the degree to which the adjustment portion 32 enters the seam 21 can be adjusted, and by adjusting the degree to which the adjustment portion 32 enters the seam 21 the width of the seam 21 can be adjusted.

Further, the backlight part 2 comprises a base plate 23 and a plurality of light-emitting units 22 installed on the base plate 23. Optionally, the base plate 23 is a glass base plate or a PCB base plate. Optionally, the light-emitting unit 22 may be a Mini LED.

In the above technical solution, the operator adjusts the width of the seam 21 by adjusting the degree to which the adjustment portion 32 enters the seam 21, so that the seam 21 is adjusted to an appropriate width; meanwhile, the above-mentioned adjustment part 3 has a simple structure and is convenient for operators to operate.

Meanwhile, the width of the seam 21 can be adjusted, which ensures that the backlight module has a stable expansion and contraction gap in reliability tests, such as high temperature and high humidity test, high and low temperature cycle test, etc., which improves the stability of performance of the backlight module.

In an optional embodiment, referring to FIG. 1 and FIG. 2, the adjustment portion 32 is an inverted cone structure; it comprises an upper end face 321 and a bottom end face, and the diameter of the bottom end face is smaller than the diameter of the upper end face 321.

Referring to FIG. 1, the outer diameter of the upper end of the adjustment portion 32 is larger than the outer diameter of the lower end of the adjustment portion 32, and the lower end of the adjustment portion 32 is clamped in the seams 21 of two adjacent base plates 23. In the present disclosure, the adjustment portion 32 cannot entirely enter the seam 21, so that the adjustment portion 32 of the adjustment part 3 not only has the function of adjusting the width of the seam 21, but also has the function of fixing the backlight part 2.

In the related art, the base plate 23 is generally fixed to the backplane 1 by an adhesive tape; however, in the technical solution of this embodiment, the base plate 23 is fixed by the adjustment portion 32. Technically, the installation of the base plate 23 of this embodiment is more convenient; meanwhile, compared with the traditional adhesive fixing, using the adjustment portion 32 to fix the base plate 23 makes the assembly structure of the backlight module more stable.

The seam 21 can be installed with a plurality of adjustment parts 3, and a plurality of the adjustment parts 3 can more stably fix the base plate 23 to the backplane 1.

The seam 21 can also be installed with only one adjustment part 3, and the one adjustment part 3 is installed in the middle of the seam 21. Compared with the above-mentioned seam 21 with a plurality of adjustment parts 3 installed, this embodiment can facilitate the operator to adjust the width of the seam 21.

It can be understood that, on the premise that the installation depth of the connecting portion 31 of the adjustment portion 32 can be adjusted, those skilled in the art can install the connecting portion 31 on the backplane 1 through various matching structures; The inner diameter of the assembly hole 11 is smaller than the width of the seam 21.

In an optional embodiment, referring to FIG. 1 and FIG. 2, the first surface of the backplane 1 is provided with an assembly hole 11 corresponding to the connecting portion 31; the assembly hole 11 is provided with an internal thread; the connecting portion 31 is provided with an external thread corresponding to the internal thread.

In this embodiment, more specifically, referring to FIG. 1 and FIG. 2, the connecting portion 31 is a cylindrical structure, which comprises a first end and a second end; an external thread is provided on the outer surface of the connecting portion 31 close to the first end. The first end of the connecting portion 31 enters the assembly hole 11, and the connecting portion 31 is threadedly connected to the assembly hole 11 through the external thread; the second end of the connecting portion 31 is fixedly connected to the bottom end face of the adjustment portion 32. The diameter of the connecting portion 31 is smaller than or equal to the diameter of the bottom end face of the adjustment portion 32, and the axes of the connecting portion 31 and the adjustment portion 32 are coincide.

In this embodiment, optionally, the length of the threaded section of the connecting portion 31 is h1; the length of the adjustment portion 32 along the axial direction of the assembly hole 11 is h2; the depth of the assembly hole 11 is h3; the thickness of the base plate 23 is h4;

The h1 and h3 satisfy the following relationship: $h3 \geq h1$;

The h2 and h4 satisfy the following relationship: $h2 > h4$.

In the above design, even if the connecting portion 31 is screwed to the deepest position, the adjustment portion 32 still does not completely enter the seam 21; in the present disclosure, in the case that the adjustment portion 32 completely enters the seam 21, in the direction perpendicular to the backplane 1, the adjustment portion 32 will lose the limiting effect to the base plate 23. If there is no such restriction, as the operator has completely screwed the adjustment portion 32 of one of the adjustment parts 3 into the seam 21, the corresponding side of the base plate 23 will be lifted up because it is no longer subjected to the pressure perpendicular to the direction of the backplane 1; in severe cases, the base plate 23 will be irreversibly deformed, thereby damaging the backlight module.

In this embodiment, optionally, the upper end face 321 of the adjustment portion 32 may be provided with a slotted pattern or a cross pattern, so as to facilitate the operator to operate the adjustment part 3 with a screwdriver.

In this embodiment, optionally, the connecting portion 31 and the adjustment portion 32 may be integrally formed.

It can be understood that the above-mentioned connecting structure between the connecting portion 31 and the backplane 1 is only a specific implementation. The deformation structure based on the above embodiments, such as changing the assembly hole 11 to an assembly groove, shall all fall within the scope of protection of this disclosure.

In an optional embodiment, in order to facilitate the assembling of the adjustment portion 32, referring to FIG. 3, an avoidance groove 231 is provided on the edge of the base plate 23 corresponding to the adjustment portion 32 of the adjustment part 3.

In this embodiment, optionally, the avoidance groove 231 may be a semicircular groove body; the inner diameter of the hole formed by two opposite avoidance grooves 231 on two adjacent base plates 23 is smaller than the diameter of the upper end face 321 of the adjustment portion 32, and larger than the diameter of the bottom end face of the adjustment portion 32.

In this embodiment, optionally, the avoidance groove 231 may also be a semi-conical groove body; the inner diameter of the avoidance groove 231 tapers in the direction toward the backplane 1. The maximum inner diameter of the holes formed by two opposite avoidance grooves 231 on two adjacent base plates 23 is smaller than the diameter of the upper end face 321 of the adjustment portion 32, and larger than the diameter of the bottom end face of the adjustment portion 32.

During the process of installing the adjustment part 3 into the backplane 1, damage will be caused to the surface of the base plate 23; meanwhile, if the adjustment part 3 is made of metal material, the backlight part 2 may also be short-circuited.

In order to avoid the above situation, in an optional embodiment, referring to FIG. 1 and FIG. 2, the adjustment part 3 further comprises a kit 33; the kit 33 is made of an elastic insulating material; the kit 33 is provided in the seam 21; the adjustment part 3 is installed on the backplane 1 through the kit 33.

In this embodiment, optionally, the kit 33 is made of rubber or plastic.

In this embodiment, optionally, the rubber may be selected from one or more of natural rubber, styrene-butadiene rubber, ethylene-propylene rubber and nitrile-butadiene rubber.

In this embodiment, optionally, the plastic can be selected from one or more of epoxy resin, polyethylene, polystyrene, polycarbonate, polyethylene terephthalate, and polytrifluorochloroethylene.

In this embodiment, optionally, referring to FIGS. 1 and 2, the kit 33 comprises a first portion 331 and a second portion 332; the first portion 331 is provided in the seam 21; the second portion 332 comprises a first end facing the backplane 1 and a second end facing away from the backplane 1; the first end is connected to the first portion 331; the outer diameter of the second portion 332 tapers along the direction toward the backplane 1; the second end of the backplane 1 is provided with an accommodating groove 3321 corresponding to the adjustment portion 32. The inner diameter of the accommodating groove 3321 tapers along the direction toward the backplane 1. The adjustment portion 32 of the adjustment part 3 can be completely accommodated by the accommodating groove 3321. The bottom of the accommodating groove 3321 is provided with a through hole 3311; the connecting portion 31 passes through the through hole 3311.

In an optional embodiment, the inner surface of the through hole 3311 is provided with an inner thread corresponding to the connecting portion 31.

The deeper the depth of the adjustment part 3 into the backplane 1, the larger the width of the seam 21; when the depth of the adjustment part 3 into the backplane 1 becomes smaller, the width of the seam 21 should also be automatically retracted (reduced), so that it is convenient for the operator to adjust the width of the seam 21.

In order to achieve the above technical effect, in an optional embodiment, a kit 33 is provided at the seam 21 corresponding to the adjustment part 3, and the adjustment part 3 connects with the backplane 1 through the kit 33. The kit 33 is made of an elastic insulating material.

In this embodiment, when the installation position of the adjustment part 3 is gradually deepened, the adjustment portion 32 of the adjustment part 3 presses the kit 33 to expand the kit 33 located in the seam 21, the kit 33 squeezes the base plate 23 on both sides thereof to expand the width of the seam 21. When the installation position of the adjustment part 3 is gradually shallowed, the kit 33 returns, the width of the seam 21 between the two adjacent base plates 23 is gradually reduced under the traction of the kit 33. In this embodiment, optionally, the kit 33 is made of rubber or plastic.

In this embodiment, optionally, the rubber may be selected from one or more of natural rubber, styrene-butadiene rubber, ethylene-propylene rubber and nitrile-butadiene rubber.

In this embodiment, optionally, the plastic can be selected from one or more of epoxy resin, polyethylene, polystyrene, polycarbonate, polyethylene terephthalate, and polytrifluorochloroethylene.

In this embodiment, optionally, the kit 33 may be fixedly connected to the base plate 23.

In an optional embodiment, in order to ensure the structural stability of the backlight module, the adjustment part 3 is made of metal material.

In an optional embodiment, the upper end face 321 of the adjustment portion 32 is coated with a reflective material.

In this embodiment, optionally, the reflective material is a reflective paint with high reflective degree such as white or gray; the function of the reflective paint is to reduce the dark lines at the seam 21 to improve the display effect.

In an optional embodiment, a plurality of the adjustment parts 3 may be disposed at the seam 21; a plurality of the adjustment parts 3 are arranged at equal distances. The upper end face 321 of each adjustment part 3 is coated with reflective material; a plurality of the adjustment parts 3 arranged at equal distances form a reflective tape, further reducing the dark lines at the seams 21 to improve the display effect.

In an optional embodiment, the edge position of the base plate 23 is also coated with reflective material, matching with the reflective material of the upper end face 321 of the adjustment part 3, further reducing the dark lines at the seam 21, to improve the display effect.

In an optional embodiment, the upper end face 321 of the adjustment portion 32 may be connected to a reflection part (not shown in the figure), and the reflection part may comprise a plurality of reflection surfaces. The light emitted by the Mini LED light-emitting unit to the reflecting surface can be reflected by the reflecting surface and emitted in a direction away from the backplane 1; the above-mentioned design can also reduce the dark lines at the seam 21 to improve the display effect.

Embodiment 2

Figure 4:
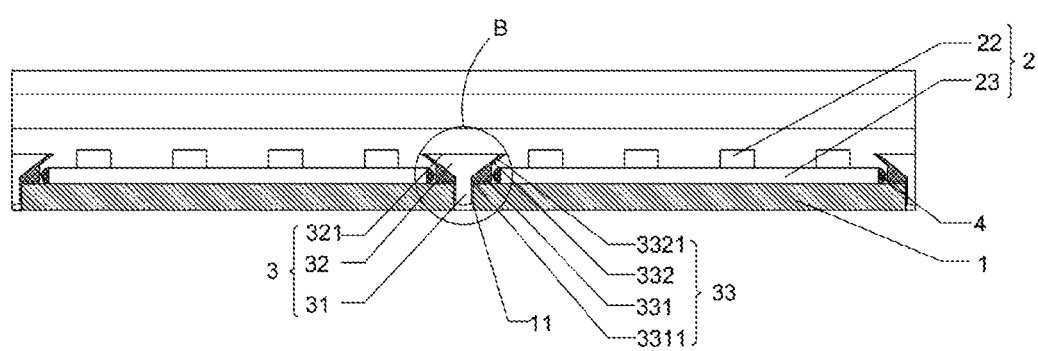
FIG. 4 is a schematic structural side view of the backlight module in Embodiment 2 of the present disclosure.
Figure 5:
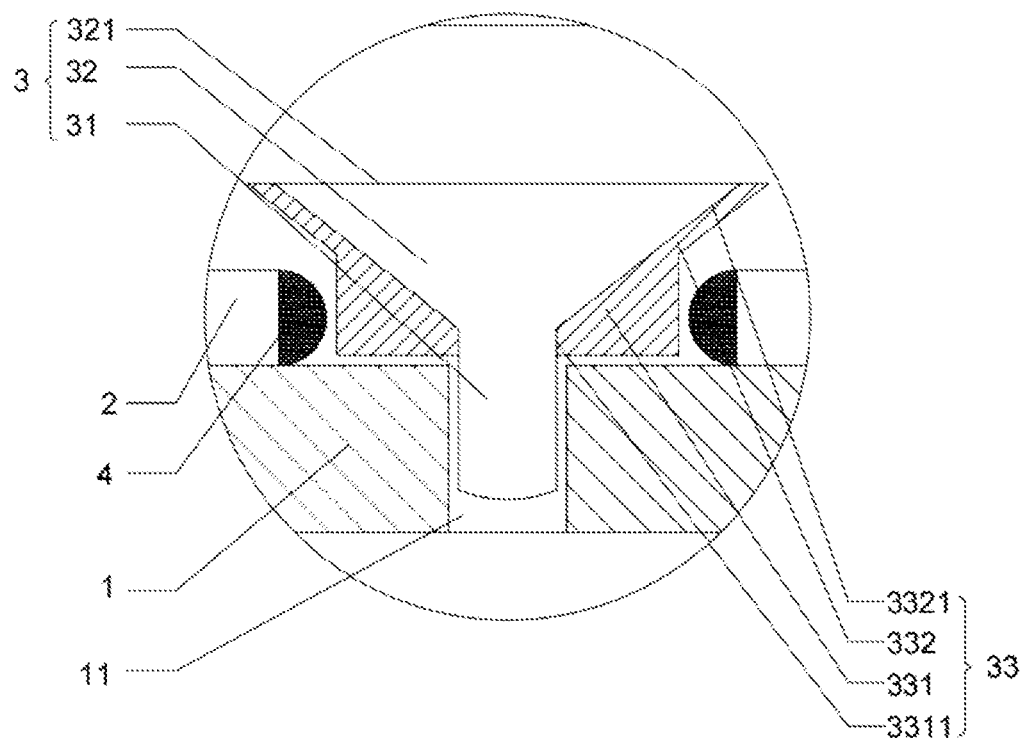
FIG. 5 is a partial enlarged view of B in FIG. 4.

Referring to FIG. 4 and FIG. 5, the backlight module comprises a backplane 1 and a backlight part 2 installed on the backplane 1; a seam 21 is spaced between two adjacent backlight parts 2; one or more adjustment parts 3 are installed at each seam 21; the adjustment parts 3 comprise a connecting portion 31 and an adjustment portion 32.

An end of the connecting portion 31 is installed on the backplane 1 through the seam 21; the depth at which the connecting portion 31 is installed in the backplane 1 is adjustable.

The adjustment portion 32 is disposed at an end of the connecting portion 31 away from the backplane 1, the outer diameter of the adjustment portion 32 tapers in the direction toward the backplane 1; an end of the adjustment portion 32 enters the seam 21; the width of the seam 21 is adjusted by adjusting the degree to which the adjustment portion 32 enters the seam 21.

The difference between this embodiment and the above-mentioned Embodiment 1 is that, in this embodiment, an insulating buffer layer 4 is coated on the side of the base plate 23.

The function of the insulating buffer layer 4 is to buffer and protect the base plate 23 at the seam 21. When the installation position of the adjustment part 3 is gradually deepened, the adjustment portion 32 of the adjustment part 3 presses the insulating buffer layer 4 to deform the insulating buffer layer 4, and the width of the seam 21 expands. When the installation position of the adjustment part 3 is gradually shallowed, the shape of the insulating buffer layer 4 is gradually restored, and the width of the seam 21 is correspondingly gradually reduced; in the above process, the insulating buffer layer 4 can provide a certain space for displacement of the base plate 23 to prevent the base plate 23 from being deformed by being squeezed by the adjustment part 3. On the other hand, the insulating buffer layer 4 plays an insulating role between the adjustment part 3 and the base plate 23.

In an optional embodiment, an avoidance groove 231 is provided on the edge of the base plate 23 corresponding to the adjustment portion 32 of the adjustment part 3; the surface of the avoidance groove 213 is also coated with insulating buffer layer 4.

In this embodiment, optionally, the avoidance groove 231 may be a semicircular groove body; an inner diameter of a hole formed by two opposite avoidance grooves 231 on two adjacent base plates 23 is smaller than a diameter of the upper end face 321 of the adjustment portion 32, and larger than a diameter of the bottom end face of the adjustment portion 32.

In this embodiment, optionally, the avoidance groove 231 may also be a semi-conical groove body; the inner diameter of the avoidance groove 231 tapers in the direction toward the backplane 1. The maximum inner diameter of the hole formed by two opposite avoidance grooves 231 on two adjacent base plate 23 is smaller than the diameter of the upper end face 321 of the adjustment portion 32, and larger than the diameter of the bottom end face of the adjustment portion 32. In an optional embodiment, the side of the insulating buffer layer 4 facing away from the backplane 1 may also be coated with the reflective material to reduce the dark lines at the seam 21 to improve the display effect.

Embodiment 3

Figure 6:
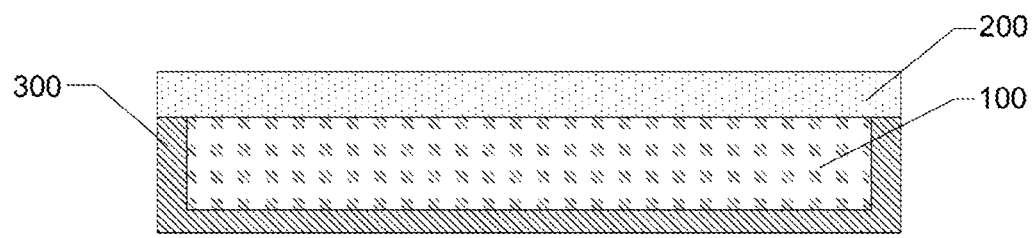
FIG. 6 is a schematic structural view of the display device in Embodiment 3 of the present disclosure.

The present disclosure also provides a display device, referring to FIG. 6, comprising: a housing 300, a backlight module 100 and a display panel 200;

The backlight module 100 is the backlight module described in Embodiment 1 or Embodiment 2, and is installed in the housing 300; The display panel 200 is installed on the casing 300, and the display panel 200 is located on the light-emitting side of the backlight module 100.

The backlight module 100 comprises a backplane 1 and a backlight part 2 installed on the backplane 1; the backlight part 2 comprises a plurality of base plates 23 regularly arranged in phase. A seam 21 is provided between two adjacent base plates 23; one or more adjustment parts 3 are installed in the seam 21. The backlight part 2 comprises a base plate 23 and a plurality of Mini LED light-emitting units 22 installed on the base plate 23, a plurality of the Mini LED light-emitting units 22 are installed on the side of the base plate 23 away from the backplane 1. The backplane 1 is installed in the housing 300; the display panel 200 is installed on the backlight module 100 and located on the light-emitting side of the backlight module 100.

In this embodiment, since the width of the seam 21 can be adjusted by screwing in or out the adjustment part 3, during the production process, the operator can replace the backlight module 100 with the unqualified size of the seam 21, so that the seam 21 meets the requirements; thus, the reject rate on the production line is reduced, which is beneficial for the production enterprise to save production costs.

In this embodiment, the seam 21 can be installed with a plurality of adjustment parts 3, which can more stably fix the base plate 23 to the backplane 1.

The seam 21 can also be installed with only one adjustment part 3, installed in the middle of the seam 21. Compared with the above-mentioned seam 21 where a plurality of adjustment parts 3 are installed, this embodiment can facilitate the operator to adjust the width of the seam 21.

Since the reflective treatment is performed on the seam 21 in the above-mentioned Embodiments 1 and 2, for example, the reflective material is coated on the upper end face 321 of the adjustment part 3; for example, the edge of the base plate 23 is coated with reflective material. The specific methods of applying the reflective material and the like have been described in detail in Embodiment 1 and Embodiment 2. The above-mentioned reflective treatment can improve the reflective ability of the seam 2, thereby reducing the dark lines displayed on the Mini LED display, and even completely avoiding the display of dark lines on the Mini LED display, thereby improving the display effect of the Mini LED display.

It should be noted that, herein, relational terms such as "first" and "second" etc. are only used to distinguish one entity or operation from another entity or operation, and do not necessarily require or imply there is such actual relationship or sequence between entities or operations. Moreover, the terms "comprises", "comprising" or any other variation thereof are intended to encompass a non-exclusive inclusion such that a process, method, article or device that comprises a list of elements comprises not only those elements, but also comprises elements not explicitly listed or other elements inherent to such a process, method, article or apparatus. Without further limitation, an element qualified by the phrase "comprising a . . . " does not preclude the presence of additional identical elements in a process, method, article or apparatus that comprises the element.

The above descriptions are only specific embodiments of the present disclosure, so that those skilled in the art can understand or implement the present disclosure. Various modifications to these embodiments will be readily apparent to those skilled in the art, and the generic principles defined herein may be implemented in other embodiments without departing from the spirit or scope of the disclosure. Thus, the present disclosure is not intended to be limited to the embodiments shown herein, but is to be accorded the widest scope consistent with the principles and novel features claimed herein.

What is claimed is:

1. A backlight module comprising a backplane and a plurality of backlight parts provided on the backplane, in which a seam is provided between the two adjacent backlight parts, wherein
an adjustment part is installed at the seam, the adjustment part comprising:
a connecting portion, an end of which is installed on the backplane through the seam; and
an adjustment portion provided at an end of the connecting portion away from the backplane, in which an outer diameter of the adjustment portion tapers along a direction toward the backplane, an end of the adjustment portion enters the seam, a degree to which the adjustment portion enters the seam is adjusted by adjusting a depth at which the connecting portion is installed in the backplane, and a width of the seam is adjusted by adjusting the degree to which the adjustment portion enters the seam.

2. The backlight module according to claim 1, wherein a first surface of the backplane is provided with an assembly hole corresponding to the connecting portion, the assembly hole is provided with an inner thread, the connecting portion is provided with an outer thread corresponding to the inner thread, and a width of the assembly hole is smaller than the width of the seam.

3. The backlight module according to claim 2, wherein the backlight part comprises a base plate and a plurality of light-emitting units, a surface of the base plate is installed on the first surface of the backplane, and a plurality of the light-emitting units are installed in an array on a surface of the base plate facing away from the backplane.

4. The backlight module according to claim 3, wherein a length of the adjustment portion along an axial direction of the assembly hole is h2, a thickness of the base plate is h4, and h2 and h4 satisfy the following relationship: $h2>h4$.

5. The backlight module according to claim 3, wherein an edge of the base plate is provided with an avoidance groove corresponding to the adjustment portion of the adjustment part.

6. The backlight module according to claim 5, wherein the adjustment part further comprises a kit made of an elastic insulating material and provided in the seam; and
the adjustment part is installed on the backplane through the kit.

7. The backlight module according to claim 6, wherein the kit comprises: a first portion provided in the seam; and a second portion comprising a first end facing the backplane and a second end facing away from the backplane, in which the first end is connected to the first portion, and an outer diameter of the second portion tapers along a direction toward the backplane; the second end is provided with an accommodating groove corresponding to the adjustment portion, and an inner diameter of the accommodating groove tapers along a direction toward the backplane; a bottom of the accommodating groove is provided with a through hole, the connecting portion passes through the through hole, and an inner surface of the through hole is provided with an inner thread corresponding to the connecting portion.

8. The backlight module according to claim 7, wherein a side of the base plate is coated with an insulating buffer layer.

9. The backlight module according to claim 1, wherein the adjustment portion has an inverted cone structure, and an upper end face of the adjustment portion is coated with a reflective material.

10. The backlight module according to claim 3, wherein an edge of the base plate is coated with a reflective material.

11. The backlight module according to claim 8, wherein a side of the insulating buffer layer facing away from the backplane is coated with a reflective material.

12. The backlight module according to claim 1, wherein an upper end face of the adjustment portion is connected to a reflecting portion comprising a plurality of reflecting surfaces.

13. The backlight module according to claim 1, wherein an upper end face of the adjustment portion is provided with a slotted pattern or a cross pattern.

14. The backlight module according to claim 5, wherein the avoidance groove is a semi-circular groove, an inner diameter of a hole formed by the two opposite avoidance grooves of the two adjacent base plates is smaller than a diameter of an upper end face of the adjustment portion and larger than a diameter of a bottom end face of the adjustment portion.

15. The backlight module according to claim 5, wherein avoidance groove is a semi-conical groove, and an inner diameter of the avoidance groove tapers along a direction toward the backplane; a maximum inner diameter of a hole formed by the two opposite avoidance grooves of the two adjacent base plates is smaller than a diameter of an upper end face of the adjustment portion and larger than a diameter of a bottom end face of the adjustment portion.

16. The backlight module according to claim 2, wherein a length of a thread section of the connecting portion is h1, a depth of the assembly hole is h3, and h1 and h3 satisfy the following relationship: $h3 \geq h1$.

17. The backlight module according to claim 1, wherein the connecting portion and the adjustment portion are formed integrally.

18. The backlight module according to claim 3, wherein the base plate is a glass base plate or a PCB base plate.

19. The backlight module according to claim 3, wherein the light-emitting unit is a Mini LED.

20. A display device comprising:
a housing;
a backlight module which is the backlight module according to claim 1 and installed in the housing; and
a display panel installed on the housing and located on a light-emitting side of the backlight module.

* * * * *